(12) United States Patent
Jenkins et al.

(10) Patent No.: US 6,823,948 B2
(45) Date of Patent: Nov. 30, 2004

(54) SLOPEBOARD MOUNTING DEVICE

(76) Inventors: Jeremy A. Jenkins, 765 E. Center St., Logan, UT (US) 84321; Flint Hamblin, 1355 N. 800 East, Apartment 6C, Logan, UT (US) 84341

( * ) Notice: Subject to any disclaimer, the term of this patent is extended or adjusted under 35 U.S.C. 154(b) by 0 days.

(21) Appl. No.: 10/079,784

(22) Filed: Feb. 19, 2002

(65) Prior Publication Data

US 2003/0155135 A1 Aug. 21, 2003

(51) Int. Cl.⁷ ............................................. A01B 59/048
(52) U.S. Cl. ...................................................... 172/810
(58) Field of Search ................................. 172/810, 811, 172/812, 815, 782, 786; 37/105, 274, 281

(56) References Cited

U.S. PATENT DOCUMENTS 3,659,363 A * 5/1972 Synder .......................... 37/231
4,079,791 A * 3/1978 Yoder et al. ................. 172/815
4,223,461 A * 9/1980 Tackitt ......................... 172/815
4,953,625 A * 9/1990 Hurworth .................... 172/305
4,969,280 A * 11/1990 Thorneloe .................... 37/281
6,460,625 B1 * 10/2002 Hales et al. ................. 172/812

* cited by examiner

Primary Examiner—Robert E Pezzuto
(74) Attorney, Agent, or Firm—Fehr Law Firm; Thompson E. Fehr

(57) ABSTRACT

A slopeboard mounting device having a rigid shaft that is attachable near a first end to a slopeboard frame and having near a second end a mechanism for indicating the desired location of a mounting lug. The rigid shaft has such a shape and size that the indicating mechanism is maintained at a desired position with respect to the first end of the rigid shaft which is the same position as is desired for a lug pivot point to have with respect to the slopeboard frame. And, preferably, the shape and dimensions of the rigid shaft are selected such that any obstructions are avoided by such rigid shaft.

16 Claims, 2 Drawing Sheets

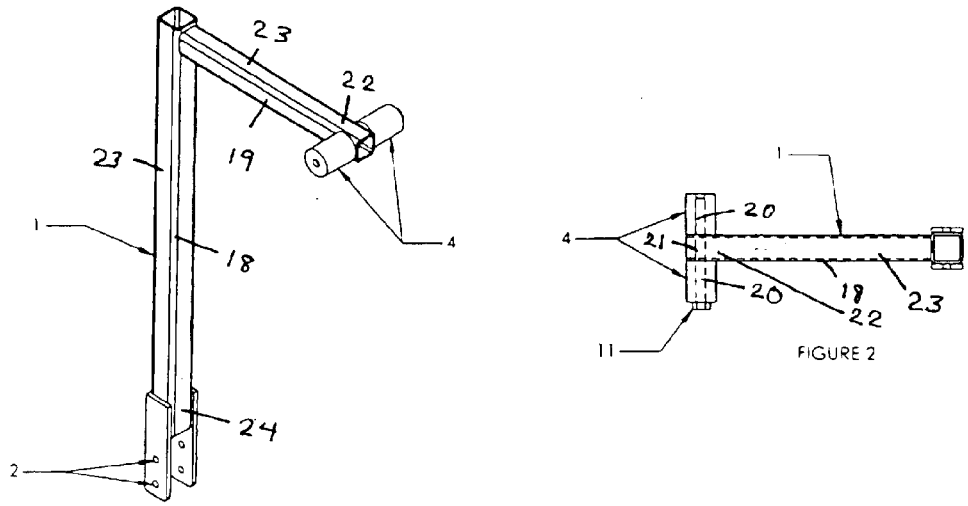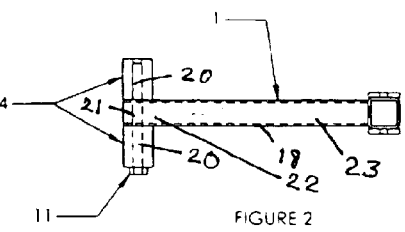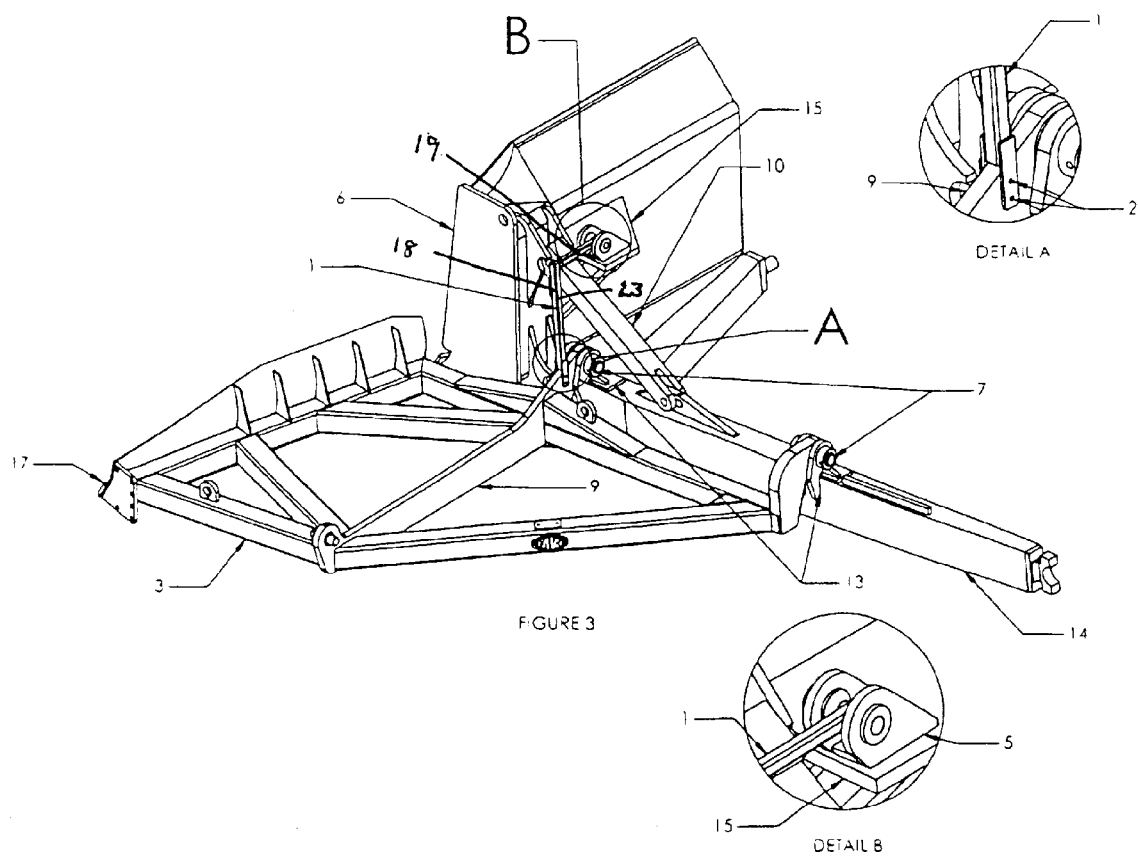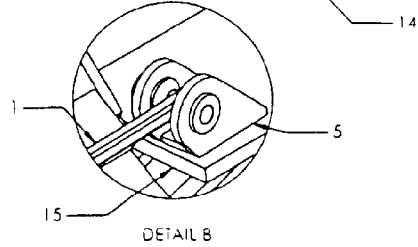

SLOPEBOARD MOUNTING DEVICE

BACKGROUND OF THE INVENTION

1. Field of the Invention

This invention relates to a device for accurately aligning slopeboard mounting brackets (commonly referred to as "lugs") on a tractor, typically a tractor having a primary push blade for earth or snow moving use.

2. Description of the Related Art

Tractors with primary push blades have arms which support the primary push blade either inside or outside the tracks or wheels that propel the tractor on the earth. Slopeboards which mount on tractors with outside arms typically attach to the tractor by means of a pair of concentrically aligned mounting brackets attached to the arm about which the slopeboard pivotally rotates. A fluid-powered cylinder links the slopeboard to the tractor and provides the means for raising and lowering the slopeboard.

In the earthmoving industry, slopeboards are considered to be an after-market attachment, meaning that the slopeboard is purchased and installed after the tractor has been shipped from the original manufacturing facility, thus requiring a user to install the slopeboard components on the tractor. This installation requires that the installer position and attach the mounting lugs on the tractor arms and blade.

Generally, the mounting lugs are attached to the tractor by means of a welding process. The accuracy of the mounting lug positions determines the performance of the slopeboard.

A slopeboard which is mounted inaccurately may perform poorly in several areas.

First, slopeboard mounting lugs which are not aligned properly will cause the slopeboard to operate in a limited range, thus the slopeboard operator may not be able to meet certain grading requirements that the slopeboard was designed to handle. Second, a slopeboard that is mounted inaccurately may not be able to be raised to a true vertical position, thus violating highway transportation laws related to the overall width of the tractor or causing the slopeboard to interfere with other earthmoving operations that the parent tractor was designed to accomplish. In addition, a slopeboard which is mounted inaccurately may be unsafe, as the angle of the hydraulic cylinder in relation to the slopeboard frame may be insufficient to support the weight of the slopeboard during normal earthmoving activities.

The traditional method for installing slopeboard mounting lugs involves following a set of factory-prescribed dimensions contained in a drawing which relates to the slopeboard model being used. The installer is required to make accurate measurements in two to three axes between the center of pivot locations on the mounting lugs. In addition, existing structural elements on the tractor constitute obstructions to measurement and usually require that the installer have the ability to measure through such obstructions because they generally cannot be easily removed.

Traditionally, all these dimensions are determined with a tape measure.

After having determined the proper locations, the installer may tack weld the lugs in place and actuate the slopeboard to see if the desired performance is met. If the desired performance is not achieved, the installer may repeat the measuring process several times until the installer does achieve the desired performance. This is especially true for the mounting lug that is designed to attach to the closed end of the fluid-powered cylinder. It is important to note that slight variances of just one fourth of an inch may affect the slopeboard range of motion by several degrees.

The inventors have a co-pending non-provisional application entitled "Slopeboard Mounting Linkage" Ser. No. 09/640,885 filed on Aug. 18, 2000. That application applies to a linkage which enables a slopeboard which mounts on the outboard arms of a tractor having a primary push blade to travel from zero to ninety degrees.

One of the inventors also has concurrently with the present application filed patent application entitled "Improved Slopeboard". That application concerns a slopeboard frame construction using a solid center beam which incorporates mounting positions on the tractor with the mounting positions for a fluid powered cylinder. Incorporating mounting positions on a solid member increases the accuracy of the slopeboard range of motion.

SUMMARY OF THE INVENTION

Use of the present mounting device by a slopeboard installer ensures accurate alignment of slopeboard mounting lug pivot points. This device greatly increases slopeboard performance and safety while reducing installation time.

A first end of the slopeboard mounting device is adapted for attachment to a point marked on the slopeboard frame during the manufacture of such frame. When the slopeboard mounting device is attached securely to the proper point on the slopeboard frame, a means for indicating the desired location, such as a pair of pins, attached to the mounting device near a second end of the mounting device aligns and determines the location for the mounting lug that is designed to attach to the closed end of the fluid-powered cylinder.

Proper use of the slopeboard mounting device eliminates the need for any measuring during the slopeboard installation. Installers of varying skill levels and experience can accurately install slopeboards with uniform success and in a timely manner.

Owners and operators will also benefit by accurate and timely installations. Use of the slopeboard mounting device will decrease installation time and cost. In addition the slopeboard will grade at all the required angles that it was designed to handle and will fold up to a true vertical position while the tractor is performing other operations or being transported on the highway.

BRIEF DESCRIPTION OF THE SEVERAL VIEWS OF THE DRAWING

FIG. 1 is an isometric view of the slopeboard mounting device.

FIG. 2 is a top view of the slopeboard mounting device with hidden lines shown so that the method for attaching the pins to the device by means of a bolt is visible.

FIG. 3 is an isometric view of a slopeboard mounted on the left-hand side of a primary push blade having outside dozer arms. The actual tractor is not shown. The slopeboard mounting device is attached to the slopeboard frame by means of two bolt holes as depicted in Detail A of FIG. 3 and is concentrically aligned with the cylinder mounting lug as shown in Detail B of FIG. 3.

DETAILED DESCRIPTION OF THE INVENTION

Figure 4:
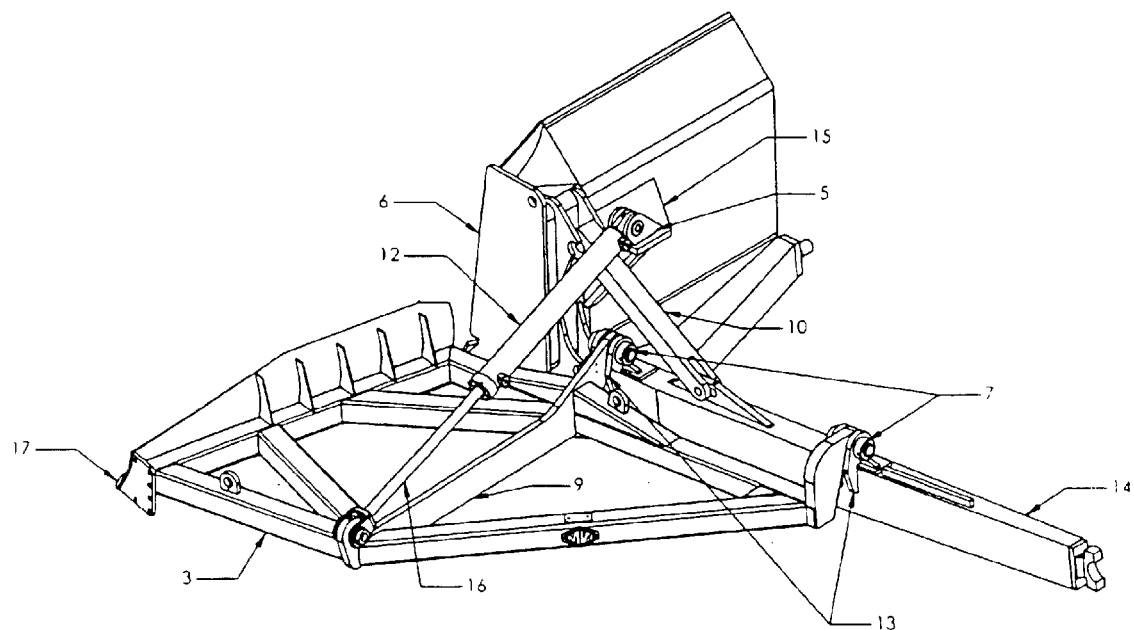
FIG. 4 is an isometric view identical to the view in FIG. 3 in all ways except that the slopeboard mounting device has been removed and the hydraulic cylinder has been inserted in its place.
Figure 5:
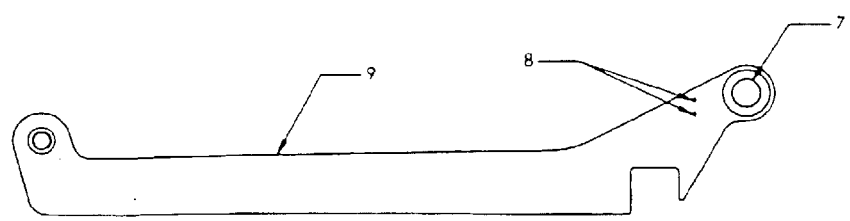
FIG. 5 is a side view of the solid steel front lug assembly which is a subassembly of the slopeboard frame.

The preferred embodiment of the present slopeboard mounting device 1 includes a rigid shaft 23; a means for attachment, which is preferably two mounting holes 2, which is located near a first end 24 of said rigid shaft 23 and which serves as a point of attachment for connecting the mounting device 1 to the slopeboard frame 3; and, located near a second end 22 of the rigid shaft 23, a means for indicating the desired location that is preferably a pair of removable pins 4 which determine the position for the cylinder mounting lug 5 on the primary push blade 6.

Preferably, the manufacturing process for the slopeboard frame 3 requires that the concentrically aligned pivot point 7 be inserted by a precision machine which is capable of precisely plotting coordinates during the same setup as the insertion of the two mounting holes 8 which are drilled into the front lug assembly 9. This ensures that the relationship between the pivot point 7 and the two mounting holes 8 in the front lug assembly 9 is sufficiently accurate and constitutes the marking during manufacturing of the point to which the mounting device 1 is to be attached.

The slopeboard mounting device 1 is preferably manufactured using steel tubing because of its stiffness and durability. The preferred design consists of two arms 18, 19 joined at substantially a ninety-degree angle which allows the mounting device 1 to clear existing obstructions such as the blade strut 10. It is important to note that different makes and models of tractors may require different mounting device designs. The two pins 4 are manufactured with a concentric hole going through the entire length of each pin. One pin 4 has a threaded hole while the other pin 4 has a non-threaded hole which is slightly larger in diameter than the diameter of the shaft 20 of the bolt 11 which secures the pins to the mounting device 1. Continuing with a discussion of the preferred embodiment, an aperture 21 is located near the second end 22 of the rigid shaft 23. The bolt 11 passes through the pin 4 having the non-threaded hole, through the aperture 21, and into the pin 4 having the threaded hole.

The key principle regarding the functionality of the slopeboard mounting device 1 is the relationship between the two mounting holes 2 and the removable pins 4. In the preferred embodiment, accuracy between these two points is preferably maintained by joining the two arms 18, 19 which make up the body of the mounting device 1 and then drilling the holes using a precision machine which is capable of precisely plotting the desired coordinates. In general, all that is essential, however, is that the slopeboard mounting device 1 be a rigid structure of such shape and size that the means for indicating the desired location, preferably the pair of removable pins 4, is maintained at a desired position with respect to the first end 24 of the rigid shaft 23 which is the same position as is desired for the lug pivot point 7 to have with respect to the slopeboard frame 3. Preferably, though, the shape and dimensions of the rigid shaft 23 are selected such that any obstructions are avoided by such rigid shaft 23.

The slopeboard mounting device 1 is generally used only once during the installation of the slopeboard frame 3 on the parent machine. In particular it is used to align the slopeboard pivot point 7 with the cylinder mounting lug 5 so that when the slopeboard cylinder 12 is actuated, the slopeboard will perform properly.

The method for using the slopeboard mounting device 1 is as follows: The installer pins the slopeboard mounting lugs 13 to the slopeboard frame 3. The installer then mounts the slopeboard on the dozer arm 14 and positions the slopeboard cutting edge 17 even with the cutting edge on the primary push blade 6. The slopeboard mounting device 1 is then bolted to a pre-marked location on the front lug assembly 9, and the bolt 11 is removed from the pair of pins 4 thus releasing the pins from the mounting device 1. The cylinder mounting lug 5 is then aligned concentrically with the hole from which the bolt 11 and the pair of pins 4 were previously removed. The pair of pins 4 is then inserted through the pivot point on the cylinder mounting lug 5, and the bolt 11 is inserted through the pin 4 without threads, through the aperture 21 of the mounting device 1 and threaded into the pin 4 which has the internal threads. The cylinder lug base plate assembly 15 is tack welded to the back of the primary push blade 6 and flush with the bottom of the cylinder lug 5. The cylinder lug 5 is then tack welded to the top of the cylinder lug base plate assembly 15 thus joining the entire cylinder mount to the back of the primary push blade 6.

The slopeboard mounting device 1 is then unbolted from the slopeboard frame 3 and the pins 4 are removed from the cylinder mounting lug 5. The closed end of the slopeboard cylinder 12 is then pinned to the pivot hole on the cylinder mounting lug 5, and the cylinder rod 16 is extended and pinned to the front lug assembly 9 which is attached to the slopeboard frame 3. At this point the slopeboard pivot 7 and the cylinder mounting lug 5 are properly aligned and the installation can be completed in preparation for earthmoving activities.

We claim:

1. A slopeboard mounting device, which comprises:

a rigid shaft having a first end and a second end;

a means for attachment of said rigid shaft to a slopeboard frame, said means for attachment being located near the first end of said rigid shaft; and a means for indicating the desired location of a mounting lug, said means for indicating being located near the second end of said rigid shaft, and said rigid shaft being selected to have such a shape and size that said means for indicating is maintained at a desired position with respect to the first end of said rigid shaft which is the same position as is desired for a lug pivot point to have with respect to the slopeboard frame.

2. The slopeboard mounting device as recited in claim 1, wherein:

the means for attachment comprises two mounting holes through which bolts can be placed.

3. The slopeboard mounting device as recited in claim 2, wherein:

said rigid shaft has an aperture near the second end of said rigid shaft; and the means for indicating comprises:

a pin having a non-threaded hole;

a pin having a threaded hole; and a bolt that passes through said pin having a non-threaded hole and the aperture within the rigid shaft before screwing into the pin having a threaded hole.

4. The slopeboard mounting device as recited in claim 3, wherein:

the shape and dimensions of said rigid shaft are selected such that any obstructions are avoided by such rigid shaft.

5. The slopeboard mounting device as recited in claim 4, wherein:

said rigid shaft comprises two arms joined at substantially a ninety-degree angle.

6. The slopeboard mounting device as recited in claim 3, wherein:

said rigid shaft comprises two arms joined at substantially a ninety degree angle.

7. The slopeboard mounting device as recited in claim 2, wherein:
    the shape and dimensions of said rigid shaft are selected such that any obstructions are avoided by such rigid shaft.

8. The slopeboard mounting device as recited in claim 7, wherein:
    said rigid shaft comprises two arms joined at substantially a ninety-degree angle.

9. The slopeboard mounting device as recited in claim 2, wherein:
    said rigid shaft comprises two arms joined at substantially a ninety-degree angle.

10. The slopeboard mounting device as recited in claim 1, wherein:
    said rigid shaft has an aperture near the second end of said rigid shaft; and
    the means for indicating comprises:
        a pin having a non-threaded hole;
        a pin having a threaded hole; and
        a bolt that passes through said pin having a non-threaded hole and the aperture within the rigid shaft before screwing into the pin having a threaded hole.

11. The slopeboard mounting device as recited in claim 10, wherein:
    the shape and dimensions of said rigid shaft are selected such that any obstructions are avoided by such rigid shaft.

12. The slopeboard mounting device as recited in claim 11, wherein:
    said rigid shaft comprises two arms joined at substantially a ninety-degree angle.

13. The slopeboard mounting device as recited in claim 10, wherein:
    said rigid shaft comprises two arms joined at substantially a ninety-degree angle.

14. The slopeboard mounting device as recited in claim 1, wherein:
    the shape and dimensions of said rigid shaft are selected such that any obstructions are avoided by such rigid shaft.

15. The slopeboard mounting device as recited in claim 14, wherein:
    said rigid shaft comprises two arms joined at substantially a ninety-degree angle.

16. The slopeboard mounting device as recited in claim 1, wherein:
    said rigid shaft comprises two arms joined at substantially a ninety-degree angle.

* * * * *